United States Patent [19]

Jayne

[11] Patent Number: 4,585,387
[45] Date of Patent: Apr. 29, 1986

[54] ROBOT ARM

[76] Inventor: William Jayne, 804 Delores St., San Francisco, Calif. 94110

[21] Appl. No.: 540,791

[22] Filed: Oct. 11, 1983

[51] Int. Cl.$^4$ ............................................. B25J 17/00
[52] U.S. Cl. ..................... 414/730; 901/15; 901/24; 901/25; 414/4; 294/116
[58] Field of Search ............... 414/724, 730, 735, 4; 901/28, 16, 17, 24, 25; 294/116, 115

[56] References Cited

U.S. PATENT DOCUMENTS

| | | | |
|---|---|---|---|
| 4,062,601 | 12/1977 | Pardo et al. | 901/28 X |
| 4,370,091 | 1/1983 | Gagliardi | 414/4 X |
| 4,381,169 | 4/1983 | Muhr et al. | 294/116 X |
| 4,480,495 | 11/1984 | Obama | 901/28 X |

FOREIGN PATENT DOCUMENTS

| | | | |
|---|---|---|---|
| 1455782 | 11/1976 | United Kingdom | 414/4 |
| 763082 | 9/1980 | U.S.S.R. | 414/4 |

*Primary Examiner*—Terrance L. Siemens
*Attorney, Agent, or Firm*—Laff, Whitesel, Conte & Saret

[57] ABSTRACT

A robot arm preferably has at least shoulder, elbow and wrist joints with a lever arm extending between each of the joints. Individually powered modules are buit into each of the lever arms adjacent each joint to control the mutual attitude between the lever arm end and its associated joint. Thus, each of the lever arms between the shoulder and elbow and between the elbow and the wrist, respectively, has two of the modules. Each individual module is operated to adjust the attitude of the lever arm relative to the adjacent joint. Or stated another way, two of the module means are operated to adjust the attitude between two adjacent lever arms.

12 Claims, 12 Drawing Figures

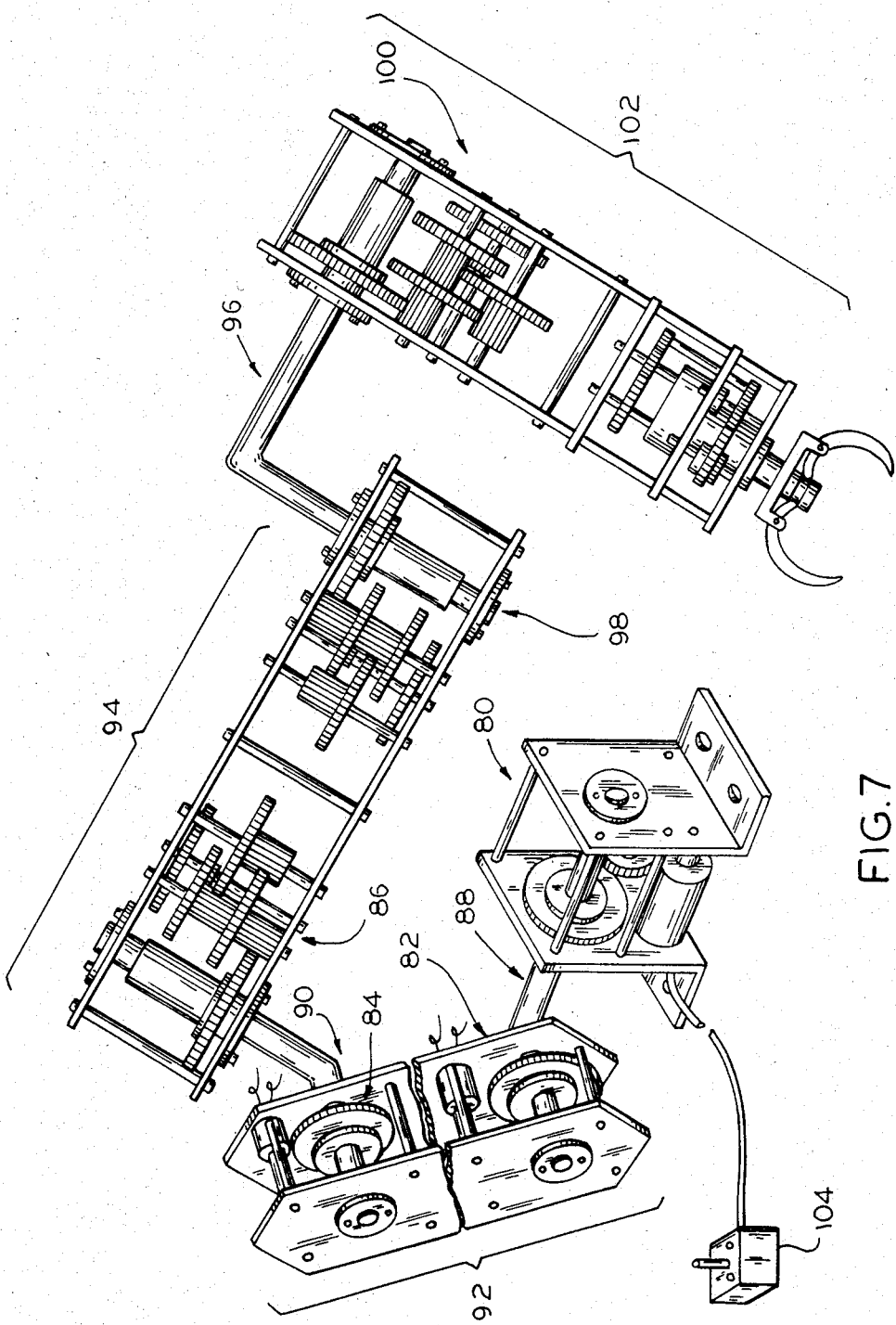

ROBOT ARM

This invention relates to robots and more particularly to robot arms having any suitable number of joints, such as a shoulder, an elbow, a wrist, and a hand.

Currently, substantial efforts are being made to develop and exploit robot arms having the capability of undertaking movements and to perform tasks which have heretofore been done by humans.

Most of the robot arms have been either extremely complicated and expensive devices or very limited and simple devices. The complicated devices were difficult to maintain and keep operative. The simple devices were very limited in what they could do. The reasons why such an arm may be used are presently unimportant. It could be used on anything from a simple toy, for example, through a complex automatic production tool.

One way or another, most of these robot arms were constructed somewhat similar to a steam shovel where the cab can rotate in a horizontal plane about a vertical axis and the arm or boom can swing back and forth in a vertical plane, thereby giving a three dimensional movement to the shovel at the end of the boom. Very often, one or more of the arm sections may also be telescoping. This type of robot arm is exemplified by U.S. Pat. Nos. 3,923,166; 4,062,455; 4,196,049; 4,353,677; and others.

Another approach uses a stationary bracket having parts which rotate around X and Y axes, selectively extending telescopic arms in either or each direction. An example of this kind of robot arm is seen in U.S. Pat. No. 4,317,560. This type of arm is, in effect, a mechanized version of laboratory stands such as those shown in U.S. Pat. Nos. 1,323,127; 3,881,888; 4,134,577, for example.

However, when one thinks of a human arm, the joints are ball and socket joints which are free to rotate in almost any direction. Thus, at best, the conventional approach to robot arms only approximates a severely handicapped arm, and not a normal human arm.

Another consideration is cost. If one looks at U.S. Pat. Nos. 4,062,455 or 4,353,677, for example, one sees a great number of parts, few of which appear to be exactly alike. Thus, there is a high cost for tooling, for maintenance, and for supplying spare parts. The concept of a sophisticated, but low cost, arm with ball and socket joints and almost unlimited motion is missing in the prior art.

Accordingly, an object of the invention is to provide new and improved robot arms with a substantial freedom of joint motion. Here, an object is to provide arms using standard modules which may be assembled in a great variety of different configurations to serve a number of different needs. In this connection, an object is to provide a standard module which may be assembled in almost any configuration simply by adding on further modules to make a more complex arm. For example, a robot arm could have a shoulder, two elbows, and three wrists in order to reach around, over, and under obstacles. Therefore, an object is to provide a robot arm with any number of articulated joints made from any number of uniform modules.

In keeping with an aspect of this invention, the basic module comprises a joint part having a pair of axles extending at right angles to each other. Each end of a lever arm has a journal bearing which is rotatably mounted on the axle of a joint part. Thus, the free end of one lever arm may rotate about an X-axis of a joint part and the free end of another and associated lever arm may rotate about a "Y"-axis of the same joint part. Accordingly, the two free ends of the two lever arms may assume almost any position, with respect to each other, which a ball and socket joint could assume. If another joint part is placed on the free end of each of these lever arms, there may be four identical lever arms linked together by three identical joint parts. If another joint part is placed on the outside and free end of each of these four lever arms, there are six lever arms which are linked together by five joints. By an extension of this principle, any suitable number of lever arms may be joined by any suitable number of joints.

Each end of each of the lever arms contains a self-powered module including a motor and a gear train which cause a mutual rotation between the arm and the associated joint. Therefore, signals may be sent to drive each arm through a preselected rotational distance around its associated joint. These signals may be programmed into an electronic memory so that the arms may preferably undertake a prescribed excursion. Alternatively, a human operator may drive the arm so that every excursion is different.

A preferred embodiment of the invention is shown in the attached drawings, wherein:

FIG. 7 shows a robot arm having a shoulder, elbow, and wrist including three lever arms, six modules, and a hand.

Figure 1:
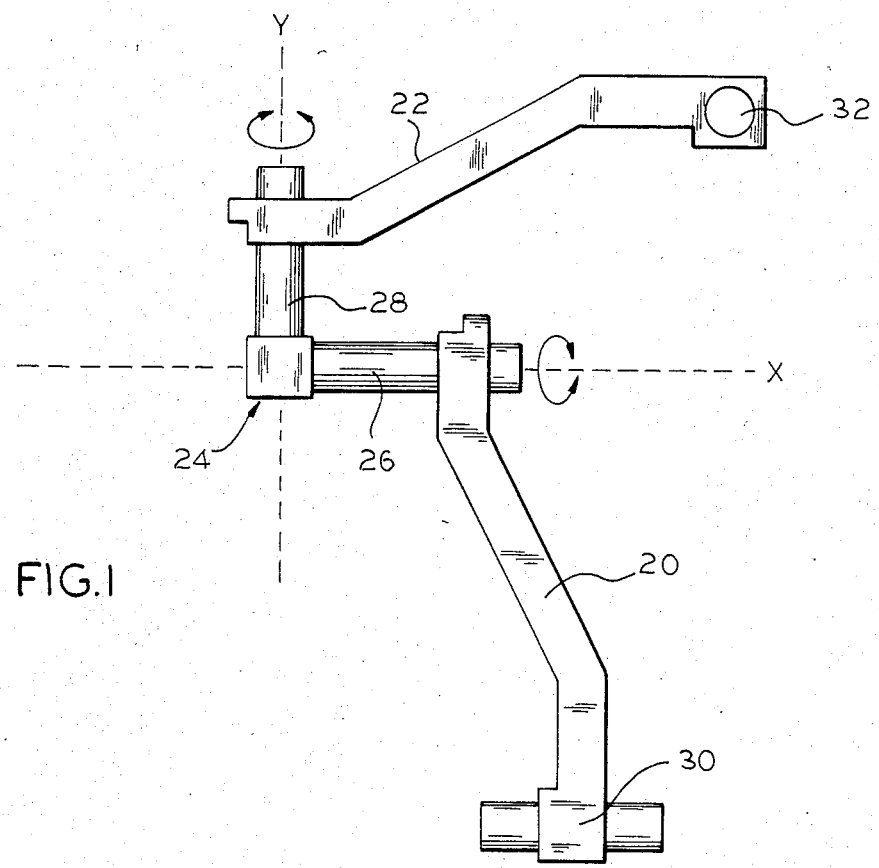
FIG. 1 shows the basic principle of the inventive articulated joint.

The basic principle of the invention is schematically shown in FIG. 1 as three piece parts forming two associated lever arms 20, 22 with a joint 24 between them. For present purposes, each arm 20, 22 may be thought of as a rigid piece of material with a hole near an end of the arm. The joint 24 is a single integrated part which has two perpendicular axles 26, 28 with circular cross section. The two axles extend in X- and Y-directions, respectively. The hole in each of the lever arms 20, 22 forms a journal bearing which fits over and turns around the associated axle. Thus, the lever arm 20 rotates about the X- axis and lever arm 22 rotates about the Y- axis. The ends of the arms 20, 22 which are joined by joint 24 are herein called "associated arms".

If the joint part 24 is twice duplicated, one such joint part may be journaled to lever arm 20 at end 30, and the other joint part may be journaled to the lever arm 22 at end 32. Then, further lever arms and joint parts may be added, thereby completing shoulder, elbow, and wrist or any other convenient number of joints.

The lever arms 20 and 22 are here shown as being slightly bent so that they may pass each other more easily as the arms rotate.

An exemplary operation of the robot arm of FIG. 1 is shown in the five stop motion views of FIGS. 2A–2E. In this figure, axle 30 may be thought of as a shoulder 30, while unit 24 may be thought of as an elbow. For ease of explanation, the motions are shown in FIGS. 2A–2E as separate and sequential movements. Actually, they may all occur simultaneously or in any convenient sequence. For example, if arm 22 must pass over obstacle 33 before arm 20 can move; then, the single motion of FIG. 2B must follow that of FIG. 2A. Thereafter, the motions of FIGS. 2C–2E may all occur simultaneously.

Figure 2A:
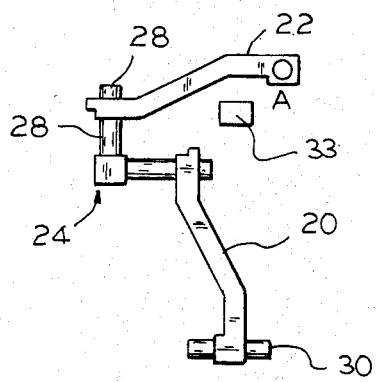
FIGS. 2A-2E show five stop motion views of the arms in FIG. 1 undertaking an exemplary excursion, which may be from a pick up position to a deposit position.
Figure 2B:
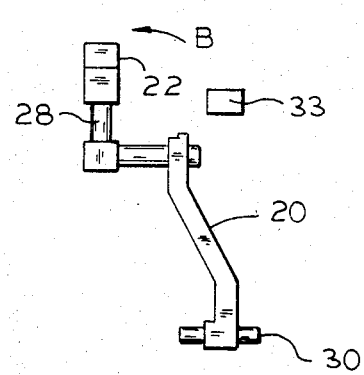

In greater detail, FIG. 2A shows the arm 22 is in a position to pick up something at location A. Then, the arm 22 begins to rotate (FIG. 2B), about the axle 28, in the direction B while the arm 20 stands still.

Figure 2C:
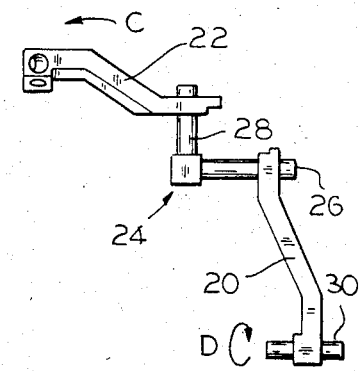

In FIG. 2C, the arm 22 has cleared the obstacle 33 and continues to turn in direction C, while arm 20 begins to rotate about axle 30 in direction D. Thus, the arm is reaching out.

Figure 2D:
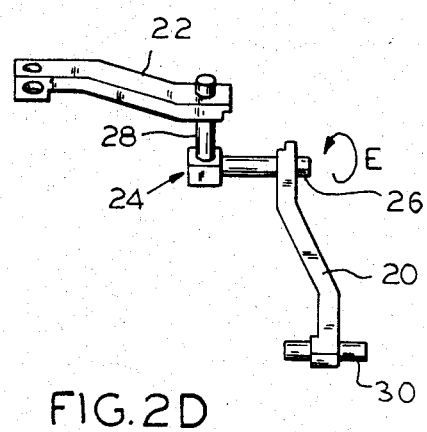

In FIG. 2D, the arm 20 continues to rotate about axle 30, in direction D (as shown in FIG. 2C), while joint part begins to rotate, in direction E (as shown in FIG. 2D), about axle 26, so that the elbow begins to straighten while the arm 22 reaches out.

Figure 2E:
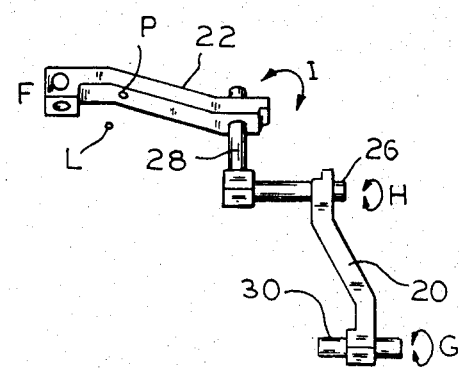

In FIG. 2E, the arm 20, 22 has straightened out and rotated about axle 28, in direction I, so that the object which was picked up at position A may be deposited at position F. A sensor mounted on the arm may control the final positioning so that there may be a final adjustment in any of the directions as indicated by the double ended arrows G, H, I. For example, the final positioning may continue until photocell P stands directly over light source L. Thus, the object may be positioned at an exact location.

As pointed out above, the stop motion views of FIGS. 2A–2E make it appear that each of the individual motions is carried out independently of the other motions. In reality, each of the lever arms moves at whatever rate is preferable for it. For example, arm 22 has been described as moving over the obstacle 33 so that the motion of FIG. 2A must occur before arm 20 begins to move in FIG. 2B. On the other hand, if arm 22 has to move under the obstacle 33, arm 20 should move to the extended position as shown in FIG. 2E before the arm 22 undertakes any motion. In a like manner, any of the lever arm motions may occur in any sequence and by any degree, either before or simultaneously with any other of the lever arm motions. The various movements may also be made by incremental amounts, which may be interleaved with other incremental amounts. This way, arm 22 alone could move a small distance; then, arm 20 along could move a small distance; then, the two arms could move simultaneously a small distance; then, arm 22 alone could move, etc.

Figure 3:
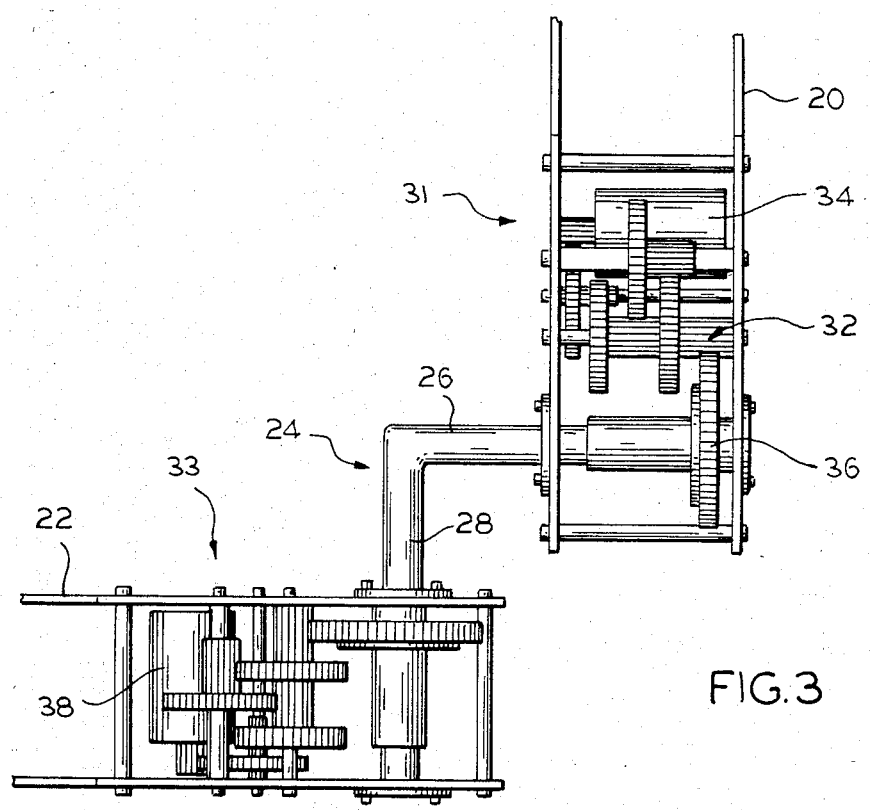
FIG. 3 shows a single articulated joint having two exemplary self-powered control modules at associated ends of two arms.

FIG. 3 illustrates a single joint and the manner of manipulating each associated lever arm and the joint between the lever arms. Here, the joint part 24 is an L-shaped rod forming the two perpendicularly related axles 26, 28. Individually associated with each of these axles is an individually powered module 31, 33, which may be identical. A gear train 32 is driven by an individually associated motor 34 which powers the module 31. In the train, a gear 36 is fixed on and rotates with the axle 26; the module 31 is fixed to and rotates with arm 20. The gearing ratio of gear train 32 is designed to convert the rotational speed of the motor 34 to the desired rotational speed of the axle 26, considering the power requirements for moving the arm.

If the lever arm 22 is fixed, the associated lever arm 20 rotates about the axle 26 when the motor 34 operates. If the lever arm 20 is fixed, the associated lever arm 22 rotates about the axle 28 when the motor 38 operates. In a like manner, if neither of the associated lever arms is fixed, either or both lever arms may rotate about the axles 26, 28 depending upon which one (or both) of the motors 34, 38 operates. Therefore, the robot arm of FIG. 3 (i.e. lever arms 20, 22 and joint part 24) may undertake any motion that the robot arm of FIG. 2 may undertake. Also, if arm 20 is properly mounted as shown in FIG. 2, the arm of FIG. 3 may undertake any of the motions of FIGS. 2A–2E.

Since the two powered modules 31, 33 are identical, any suitable number of them may be placed in series with any suitable number of joint parts to make any suitable number of lever arm sections in a given robot arm.

Figure 4A:
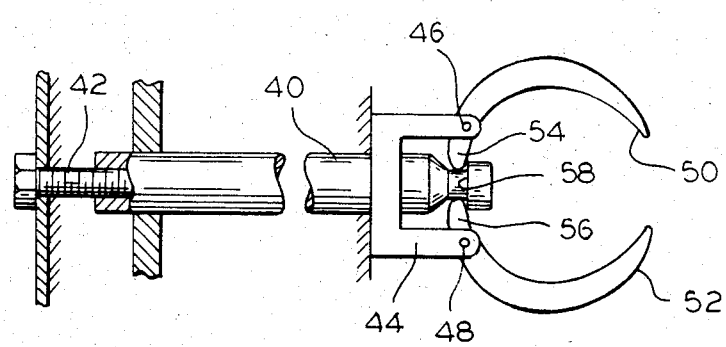
FIG. 4A shows the hand in an open position.
Figure 4B:
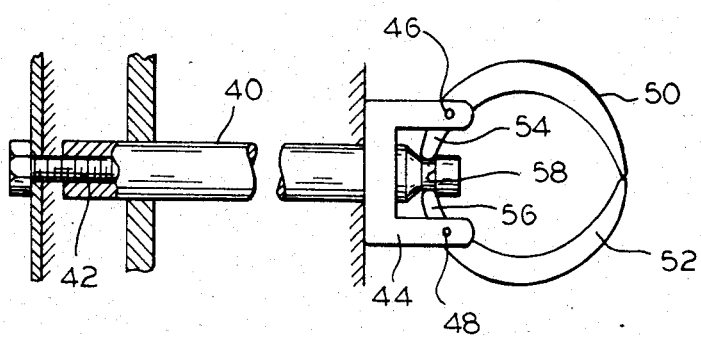
FIG. 4B shows the same hand in a closed position.

The hand is shown in FIGS. 4A and 4B, as including a very simple telescoping shaft comprising an outer shaft 40 having a threaded central hole for receiving an immobile threaded bolt 42. If the shaft 40 is rotated one way, the combined telescoping shaft 40, 42 gets longer. If rotated the other way, the shaft gets shorter.

The shaft 40 slides through a fixed U-shaped shackle 44. Pivotally mounted at 46, 48 on the opposing ends of the shackle 44 are a pair of crescent shaped arm members 50, 52. The inner tips 54, 56 of crescent arms 50, 52 are captured in an annular groove 58 on the end of shaft 40. Therefore, when shaft 40 is turned in a direction which lengthens the telescoping shaft 40, 42, the end of shaft 40 slides out (Direction J) through bracket 44 to push out (FIG. 4A) the tips 54, 56 and thereby open the hand formed by crescent arms 50, 52. When the shaft 40 is turned in an opposite direction to shorten the telescoping shaft 40, 42, the end of shaft 40 slides back (Direction K) through bracket 44 to pull in (FIG. 4B) the tips 54, 56 and thereby close the hand formed by crescent arms 50, 52. Thus, FIG. 4A shows the hand open and FIG. 4B shows the hand closed. Suitable sensors may be provided to stop the rotation of shaft 40 when a certain force is encountered, thereby insuring that the hand grips tightly but not too tightly.

The rotation of shaft 40 may be controlled by a standard powered module 31, 33, simply by substituting the shaft 40 for one of the axles 26, 28. Or, preferably, the standard module may be modified slightly by rotating it by 90° as shown at 60 in FIG. 5 so that the hand extends straight out the end of the module, instead of perpendicularly therefrom.

Figure 5:
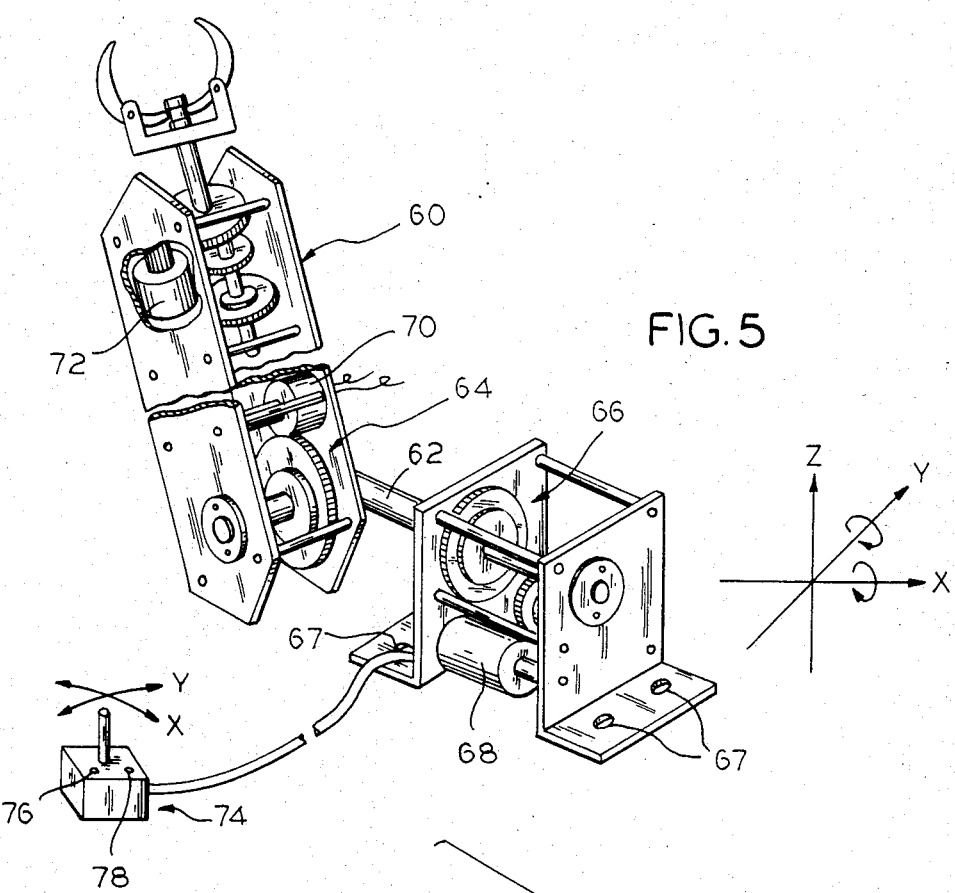
FIG. 5 shows a simple robot arm using three modules to provide one joint and a hand to form an arm having one joint and a single lever arm.
Figure 6:
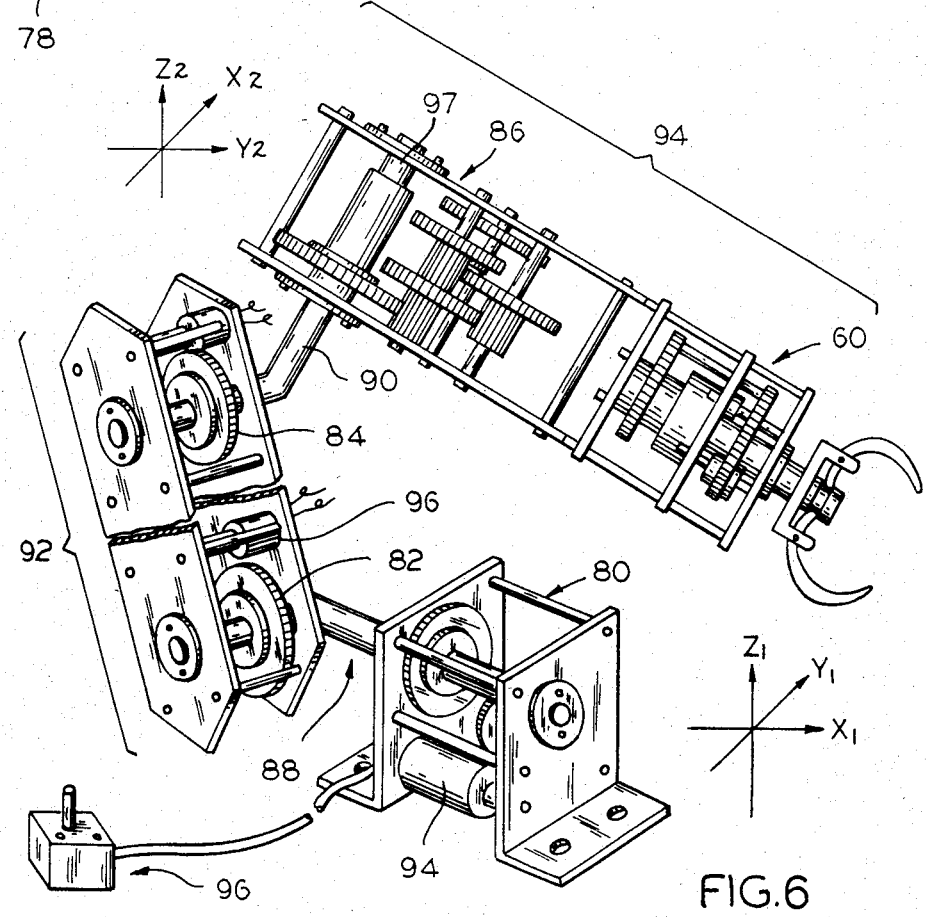
FIG. 6 shows a use of four modules to provide a robot arm having two lever arms with a shoulder and an elbow (plus the module and hand)

It should now be apparent that any suitable number of the individually powered modules may be assembled in various ways to provide different robot arm capabilities, as illustrated by a few exemplary configurations in FIGS. 5–7.

In FIG. 5, the robot arm has one right angled axle joint part 62, and two associated modules 64, 66, which is the robot arm configuration described in FIG. 3. The module 66 is mounted in an immobile base bolted to a chassis at 67. The hand 60, and its individually associated module 69 are fixed on the end of an arm including module 64. Therefore, the hand may move to any position which may be reached by a rotation around the "X" and "Y" axes formed by joint part 62, the positioning being accomplished by individually controlling the motors 68, 70, respectively. The hand 60 may be opened and closed by individually operating the motor 72 in its associated powered module 69. Therefore, the arm and hand position may be controlled by a joy stick 74 which generates "X" and "Y" axes signals, and by push buttons 76, 78 which control the opening or closing of the hand. This is somewhat like an arm with only a shoulder joint and a hand.

In FIG. 6, the robot arm has four self-powered modules 80, 82, 84, 86, two perpendicular axle joint parts 88, 90, and two lever arms 92, 94. The arms 92, 94 are shaped at each of their confronting ends (as shown at 91, 93) to pass closer to their associated arms. Modules 82, 84 are at opposite ends of lever arm 92. Joint part 88 is a shoulder joint and joint part 90 is an elbow joint. The joint part 88 operates in the same manner that was described above in connection with FIGS. 3 and 5 to position the joint part 90 at any location which may be reached by rotation of arm 92 around axes X1, Y1. As commanded by a selective operations of their individual motors, the modules 84, 86 may operate to move the lever arm 94 to any position which may be reached by rotation around axes X2, Z2. Therefore, FIG. 6 shows a robot arm with a shoulder and an elbow.

Again, the control may be accomplished by means of a joy stick 96. Except for winding the control and power cords around an axle, there is no reason why arm 94, for example, could not circle endlessly about the joint part 90. Therefore, limit switches may be built into each arm to reduce its traverse to some reasonable arcuate excursion which may be more or less than a complete circle, as long as the wires are not damaged. Thus, for example, arm 94 could rotate around the axle 97 through an arcuate segment of 300°; 360°; or 400°.

This means that the joy stick 96 may be pushed in one direction and shoulder joint 88 may move the arm as far as permitted by its associated limit switches. When the limit switches operate, there may be a change over to operate elbow joint 90. This way, a single joy stick 96 may operate the entire arm. However, that use of a single joy stick means that the arm controls its own trajectory, which may or may not be good. Accordingly, an alternative is to provide two joy sticks, one for controlling the shoulder joint 88 and another for controlling the elbow joint 90.

In FIG. 7, there is a shoulder 88, an elbow 90, and a wrist 96 using six individually associated self-powered modules 80, 82, 84, 86, 98, 100. Therefore, there are three lever arms 92, 94, 102, each of which is free to move to any place in rotation about its two axes. From the foregoing, it should be apparent that an arm may be constructed with any suitable number of joint parts and lever arm sections.

A box 104 is shown in FIG. 7 to represent any suitable automatic controls involving sensors, microprocessors, or the like. The sensors may be controlled by or strapped to a person's arm to sense the positions of its joints. These sensed positions may then be used to control the positons of the robot's arm. U.S. Pat. No. 3,923,166 shows one example of such a control.

A microprocessor may be programmed in a manner which is apparent from the controls of any numerical table having "X" and "Y" controls such as U.S. Pat. Nos. 3,101,436; 3,414,785. By way of example, U.S. Pat. No. 3,101,436 uses resolvers to detect the movement of a part to a commanded position. U.S. Pat. No. 3,414,785 uses a stepping motor which makes a preselected number of steps which are determined by a count stored in a memory. Accordingly, the controls of box 104 may program a stepping motor in each module to operate responsive to a predetermined number of drive pulses. Then, if a more precise positioning is required, the controls may change over to operate to a final position determined by a resolver or by sensors.

It should now be apparent that the invention provides a simple, self-powered module which may be duplicated any number of times to produce any suitable robot arm motion. About the only limitation on the flexibility of the robot arm is the need to supply power and control signals, if wires are used. However, if a microwave transmission is used between box 104 and the controlled motor, the need for signal wires may be eliminated. There are a number of ways for transmitting power through rotational unions (such as sliding contacts or brushes, for example). Therefore, even the power supply does not pose any real restriction on arm movement. Thus, there is no practical reason why the arm 102, for example, may not circle endlessly. If the lever arms are made of lightweight materials (such as printed circuit boards), the robot arm may be part of a small toy. If they are made of massive metal beams, the arm may be part of a large-scale production machine, such as may be used in an automobile factory, for example. Hence, the invention provides an extremely flexible design having a great variety of uses.

Those who are skilled in the art will readily perceive how to modify the invention. Therefore, the appended claims are to be construed to cover all equivalent structures which fall within the true scope and spirit of the invention.

The claimed invention is:

1. A robot arm comprising at least two lever arms, each having a journal bearing in at least one end thereof, a joint part for interconnecting said two lever arms, said joint part comprising a generally L-shaped member forming a pair of rigidly interconnected axles mounted in the journal bearings of individually associated ones of said lever arms, and individually powered module means in each of said lever arms for turning the journal in said lever arm about the axle mounted in that journal, whereby said arms move about axes which are offset with respect to each other.

2. The robot arm of claim 1 and hand means mounted at an end of said robot arm, said hand comprising a pair of grasping arms which are pivotally mounted to oppose each other, sliding shaft means for selectively moving said opposing grasping arms on said pivot means, the pivoted ends of said grasping arms being mounted in an annular groove on the end of said sliding shaft whereby said grasping arms may circle said shaft endlessly, said opposing grasping arms moving apart responsive to motion of said shaft sliding in one direction and moving together responsive to motion of said shaft sliding in an opposite direction, and an individually powered module means for selectively sliding said shaft to open and close said hand.

3. The robot arm of claim 1 wherein said rigidly interconnected arms are set at a right angle.

4. The robot arm of claim 3 wherein one of said lever arms is immobilized to form a base for securing one of said powered module means in a fixed location, whereby the other of said lever arms may be moved to any position which may be reached by rotation about said pair of axles responsive to operation of said self-powered module means.

5. The robot arm of claim 4 and a second of said joint parts on the opposite end of said other of said lever arm, and a third of said lever arms coupled at one end to said second joint part.

6. The robot arm of claim 5 and a third joint part on an opposite end of said third lever arm, and a fourth of said lever arms coupled at one end to said third joint part.

7. A robot arm comprising at least shoulder, elbow and wrist joints with a lever arm extending between each of said joints, each joint having a pair of offset axles which enables each arm to turn a full 360° about an individually associated one of said pair of axles, individually powered module means in each of said lever arms adjacent each of said joints, whereby each of the lever arms between the shoulder and elbow and between the elbow and the wrist, respectively, has two of said modules, and means for operating each of said module means to adjust the attitude of the associated lever arms relative to the joint adjacent said module means whereby two of said module means are operated at each joint to adjust the attitude of two adjacent lever arms.

8. The robot arm of claim 7 and sensor means for adjusting the final position of at least one of said lever arms.

9. The robot arm of claim 8 wherein said intersection of said axles is a right angle.

10. The robot arm of claim 7 wherein each of said joints comprises an L-shaped member forming said offset axles, said pair of axles being perpendicularly associated with each other, and each of said modules includes a gear train driven by an individually associated motor for rotating a lever arm about an associated one of said axles.

11. The robot arm of claim 10 wherein said motor is a stepping motor and means for delivering a predetermined number of drive pulses to the stepping motor in each of said module means whereby the motion of said arm may be programmed by delivering a predetermined number of drive pulses.

12. The robot arm of claim 7 and hand means on the end of said robot arm, said hand means comprising a pair of grasping arms which are pivotally mounted to oppose each other, sliding shaft means for selectively moving said opposing grasping arms on said pivot means, said grasping arms being coupled to said shaft by a means for enabling said hand to rotate through a full 360°, said opposing grasping arms moving apart responsive to motion of said shaft in one sliding direction and moving together responsive to motion of said shaft sliding in an opposite direction, and an individually powered module means for selectively sliding said shaft to open and close said hand.

* * * * *